United States Patent
Lu et al.

(10) Patent No.: US 7,819,329 B2
(45) Date of Patent: Oct. 26, 2010

(54) METHOD OF ACTIVATING A FINGERPRINT IDENTIFICATION PROCESS OF A SMART CARD ACCORDING TO A GIVEN CONDITION AND A DEVICE THEREOF

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 294 days.

(21) Appl. No.: 12/099,925

(22) Filed: Apr. 9, 2008

(65) Prior Publication Data
US 2008/0296371 A1    Dec. 4, 2008

(30) Foreign Application Priority Data
May 29, 2007    (CN) .................. 2007 1 0099707

(51) Int. Cl.
*G06K 19/06*    (2006.01)
(52) U.S. Cl. .................. 235/492; 235/379; 235/380; 235/487
(58) Field of Classification Search ............ 235/379, 235/380, 487, 492
See application file for complete search history.

(56) References Cited
U.S. PATENT DOCUMENTS

| | | | |
|---|---|---|---|
| 5,180,901 A | | 1/1993 | Hiramatsu |
| 5,627,355 A | * | 5/1997 | Rahman et al. ............. 235/380 |
| 5,869,822 A | * | 2/1999 | Meadows et al. ........... 235/380 |
| 6,325,285 B1 | * | 12/2001 | Baratelli ..................... 235/380 |
| 2002/0150282 A1 | * | 10/2002 | Kinsella ..................... 382/124 |
| 2004/0129787 A1 | * | 7/2004 | Saito et al. .................. 235/492 |
| 2006/0016879 A1 | * | 1/2006 | Kean .......................... 235/380 |
| 2007/0073619 A1 | * | 3/2007 | Smith .......................... 705/41 |
| 2008/0028230 A1 | * | 1/2008 | Shatford ..................... 713/186 |

FOREIGN PATENT DOCUMENTS

EP    0994439 A2    4/2000

\* cited by examiner

*Primary Examiner*—Michael G Lee
*Assistant Examiner*—Ali Sharifzada
(74) *Attorney, Agent, or Firm*—Hammer & Associates, P.C.

(57) ABSTRACT

The present invention relates to a method of activating a fingerprint identification process of a smart card according to a given condition and a device thereof. The present invention uses a contactless smart card as a carrier of the fingerprint identification technology and incorporates user identification during use of the card to make the transaction or access process more secure and efficient. The invention provides the steps of how to determine whether the fingerprint identification process of the smart card should be activated to verify the validation of the user before the transaction according to the comparison result between the transaction amount and the preset conditional value.

5 Claims, 3 Drawing Sheets

METHOD OF ACTIVATING A FINGERPRINT IDENTIFICATION PROCESS OF A SMART CARD ACCORDING TO A GIVEN CONDITION AND A DEVICE THEREOF

FIELD OF THE INVENTION

The present invention relates to the field of smart card applications, and more particularly, to a method of activating a fingerprint identification process of a smart card according to a given condition and a device thereof. The present invention uses a contactless smart card as a carrier to integrate the fingerprint identification technology into a chip of the card, and incorporates user identification during use of the card to make the transaction or access process more secure and efficient.

BACKGROUND OF THE INVENTION

It is known that the smart card is a kind of chip card. The data is stored and calculated in the chip embedded in a plastic substrate and can be read by a card reader. In the prior art, the smart card is applied widely in many fields, such as communication, insurance, medical service, computer control system, access control system, online transaction, and identity authentication, etc. The convenience and security of the transaction are improved by the smart card on the basis of two outstanding features. One is that the identity card can define the identity of the user; and the other is that the smart card can store the encrypted data. Some smart cards can encrypt or decrypt the data by its micro-processor. In addition, the smart card has some advantages, such as mass-storage, stability, portability, and compatibility, etc.

Generally, according to the ways of use, the smart card can be classified as the contact smart card and the contactless smart card (or the non-contact smart card) with a memory and a micro-processor. The contactless smart card has an antenna and a micro-electronic chip embedded in the card body. The transaction can be processed by putting the contactless smart card close up to the antenna of the card reader without contacting the coupling sensor. The data stored in the contactless smart card can be read instantly and processed without contacting the external card reader, which saves 70% to 90% processing time in comparison with the contact card. On the basis of the advantages above, the contactless smart card is applied widely in many fields, such as medical service, traffic, social insurance, and tax, etc. So the contactless smart card becomes more and more popular and accounts for more market shares for the features of convenience and usability.

The contactless smart card technology is widely used in many payment systems for consumption, such as credit card system, debit card system, and public traffic charge system. The Chinese Patent Application No. 01145481.4 discloses a fingerprint identification technology applied in the security access control. But this patent does not include the smart card technology applied in the transaction system. In some sense, the application field of the technology is limited. The Chinese Patent Application No. 200310103495.2 discloses fingerprint identification method based on fingerprint minutiae feature matching and direction field matching. In the patent, the technology of obtaining the matching result by putting the finger of the user in the right direction field and comparing it with the stored fingerprint minutiae feature is regarded as a prior art, which is used widely in the fingerprint identification field. The Chinese Patent Application No. 01124082.2 discloses a wristwatch smart card with the function of the finger identification. The patent integrates the finger identification technology with the wristwatch IC card, which provides more functions but cannot be specified for the specific user.

The fingerprint identification technology in the patent above provides a solution for identity authentication in the security or consumption of different levels for using the smart card. In some sense, it is too complex in the process of using the smart card, which speeds up the damage of the smart card and reduces the life of the chip inside the smart card. And even a small amount of the transaction or some security of low levels needs the fingerprint identification. If the legitimate user cannot come to confirm the operation personally, he cannot consign the others to perform the operation, which is inconvenient in the event of emergency.

SUMMARY OF THE INVENTION

To overcome the disadvantages in the prior art, the present invention provides a method of activating the fingerprint identification process of a smart card according to a given condition and a device thereof. The present invention uses a contactless smart card as a carrier to integrate the fingerprint identification technology into a chip of the card, and incorporates user identification during use of the card to make the transaction or access process more secure and efficient.

In the method provided by the invention, the contactless smart card chip can determine whether the fingerprint identification process should be activated according to the operation level in the process of using the card by the cardholder. In this way, the effectiveness and security is ensured in the transaction or access.

The invention provides the following solution.

The method for activating the fingerprint identification process of the smart card according to a given condition comprises the steps of:

1) setting a conditional value for activating the fingerprint identification process of the smart card;

2) reading a command from the card reader by the smart card;

3) determining by the smart card whether the fingerprint identification process should be activated before execution of the command obtained in step 2), according to the conditional value obtained in step 1);

4) accordingly, activating the fingerprint identification process of the smart card if step 3) is with a result for verifying a fingerprint input of a user and to authenticate the user whether the user is a legitimate user, and executing the command obtained in step 2) if the user is a legitimate user, or rendering an error message if the user is not a legitimate user;

or executing the command obtained in step 2) directly if step 3) is with a result for not verifying a fingerprint input of a user.

The conditional value of activating the fingerprint identification process of the smart card is the threshold value of the transaction amount or the access level for secure entrance. The threshold value of the transaction amount or the access level for secure entrance is the numerical value by which the smart card determines whether activates the fingerprint identification process. If the numerical value in the command from the card reader is greater than the value for the conditional value, the fingerprint identification process will be activated; otherwise, the process will not be activated.

The smart card is a contactless smart card.

The threshold value of the transaction amount or the access level for secure entrance is set up by the user or the distribution center of the contactless smart card.

The verification process for the fingerprint information input by the user is performed inside the smart card.

The device to realize the above method of activating the process of fingerprint identification of the smart card according to a given condition includes a smart card. The smart card comprises a control unit, an induction unit, a wireless communication unit, a data storage unit, a fingerprint acquisition unit, and a fingerprint identification unit. The device is characterized by having a command determination unit for determining whether the command transmitted from the card reader should activate the fingerprint identification process of the smart card according to the conditional value.

The smart card is a contactless smart card.

The induction unit inside the contactless smart card consists of induction coils.

The fingerprint acquisition unit for acquiring the fingerprint of the user is a fingerprint scanner or sensor.

The fingerprint identification unit for comparing the acquired fingerprint with the fingerprint template of the user determines whether the acquired fingerprint is effective.

Compared with the prior art, the advantages of the present invention are as follows. The present invention provides such a function of fingerprint identification that one person is with a unique code. Even if the illegitimate one obtains the smart card, he cannot perform transaction with large sum or access the high level security entrance; In addition, the method of the present invention and the device thereof simplify the process of using the smart card by omitting the step of entering password, which solves the problem that the passwords are losable. In a word, the smart card in the method and system provided by the present invention can store the transaction information and access log, and the user can inquire or print the needed information.

DETAILED DESCRIPTION OF THE PREFERRED EMBODIMENTS

The present invention is further described with the embodiments and the drawings below.

Figure 1:
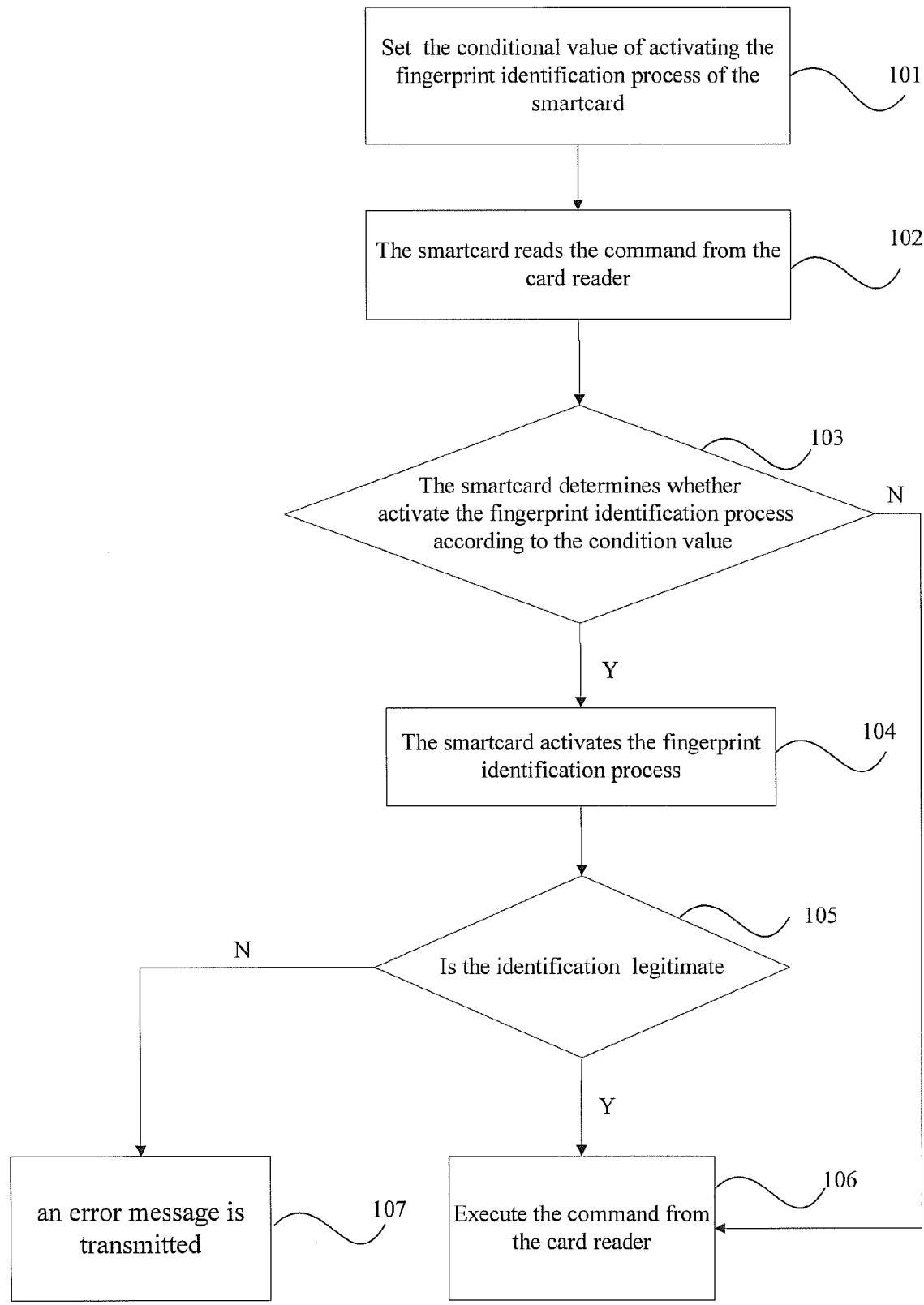
FIG. 1 shows the process of activating the fingerprint identification process of the smart card according to a given condition in the present invention.

Referring to FIG. 1, the method of activating the fingerprint identification process of a smart card according to a given condition comprises the following steps.

Step 101: Set the condition value by which the fingerprint identification process of the smart card will be activated.

Step 102: The smart card reads the command from the card reader.

Step 103: The smart card determines whether the command from the card reader at step 102 is the command that should activate the fingerprint identification process according to the conditional value which is set tip at step 101; If yes, go to step 104, otherwise go to step 106.

Step 104: The smart card will activate the process and go to step 105.

Step 105: The smart card will verify the fingerprint information entered by the user and determine whether the identification of the user is legitimate, if yes, go to step 106; otherwise go to step 107.

Step 106: The command from the card reader in step 102 will be executed.

Step 107: An error message is transmitted.

The conditional value for activating user identification process of the smart card is a threshold for security entry access level or transaction amount. For example, if the value in the command from the card reader is greater than the conditional value, the process of the fingerprint identification will be activated; otherwise, the process of the fingerprint identification will not be activated.

The smart card above is a contactless smart card. The threshold value of the transaction amount or the access level for secure entrance is set up by the user or the distribution center of the contactless smart card.

The verification process for the fingerprint information input by the user is performed inside the smart card.

Figure 2:
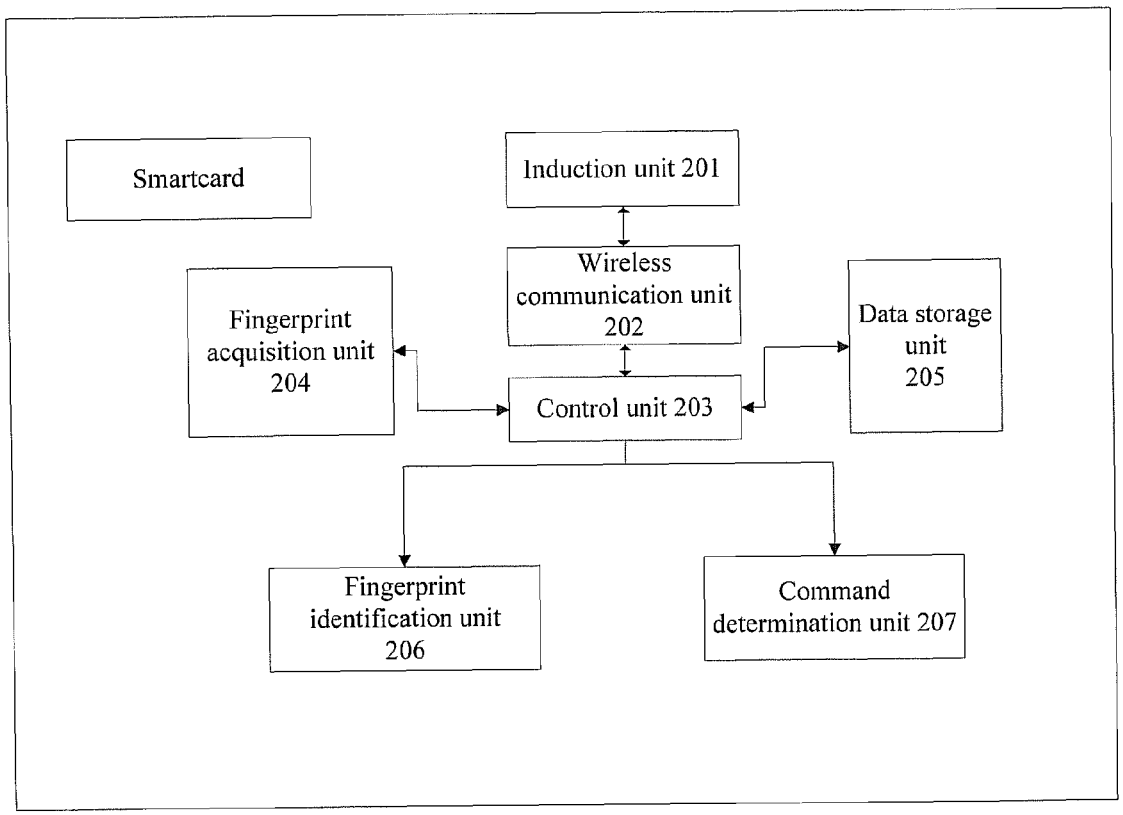
FIG. 2 shows the schematic view of the device with the feature of activating the fingerprint identification process of the smart card according to a given condition in the present invention.

Referring to the FIG. 2, the device to realize the above method of activating the process of fingerprint identification of the smart card according to a given condition includes a smart card. The smart card comprises an induction unit 201, a wireless communication unit 202, a control unit 203, a fingerprint acquisition unit 204, a data storage unit 205, a fingerprint identification unit 206, and a command determination unit 207 for determining whether the command from the card reader should activate the fingerprint identification process of the smart card according to the conditional value.

The induction unit 201 consists of induction coils for generating the induced current to provide the power for the smart card. The wireless communication unit 202 for integrating and receiving and transmitting electromagnetic wave realizes the data interaction between the smart card and card reader.

In the present embodiment, the operation principle of the induction unit 201 and wireless communication unit 202 is as follows. Since the induction coils generate the electromagnetic wave, the induction coils inside the smart card will receive the energy of the electromagnetic wave when the smart card is within the magnetic field. The circuits inside the smart card will rectify the received electromagnetic wave and stabilize the voltage as the working voltage of the smart card system, and modulate the received amplitude modulation pulse to get the information which will be transmitted to the internal control unit 203, and transmit the data stored in the data storage unit 205 by the induction coils.

The control unit 203 for controlling the data communication between the smart card and the card reader coordinates work of the units inside the smart card.

The fingerprint acquisition unit 204 is for acquiring the fingerprint information. In the present embodiment, the fingerprint acquisition unit 204 is a fingerprint image sensor.

The data storage unit 205 is for storing the transaction information, access record and the user fingerprint template database and the fingerprint information acquisition in the process of using the smart card.

Fingerprint identification unit 206 is for comparing the user fingerprint information acquired by the fingerprint acquisition unit 204 with the fingerprint information of legitimated user stored in the data storage unit 205, and determines whether they are matched. In this way the validity of the user fingerprint is verified and the process of the fingerprint identification is completed.

Figure 3:
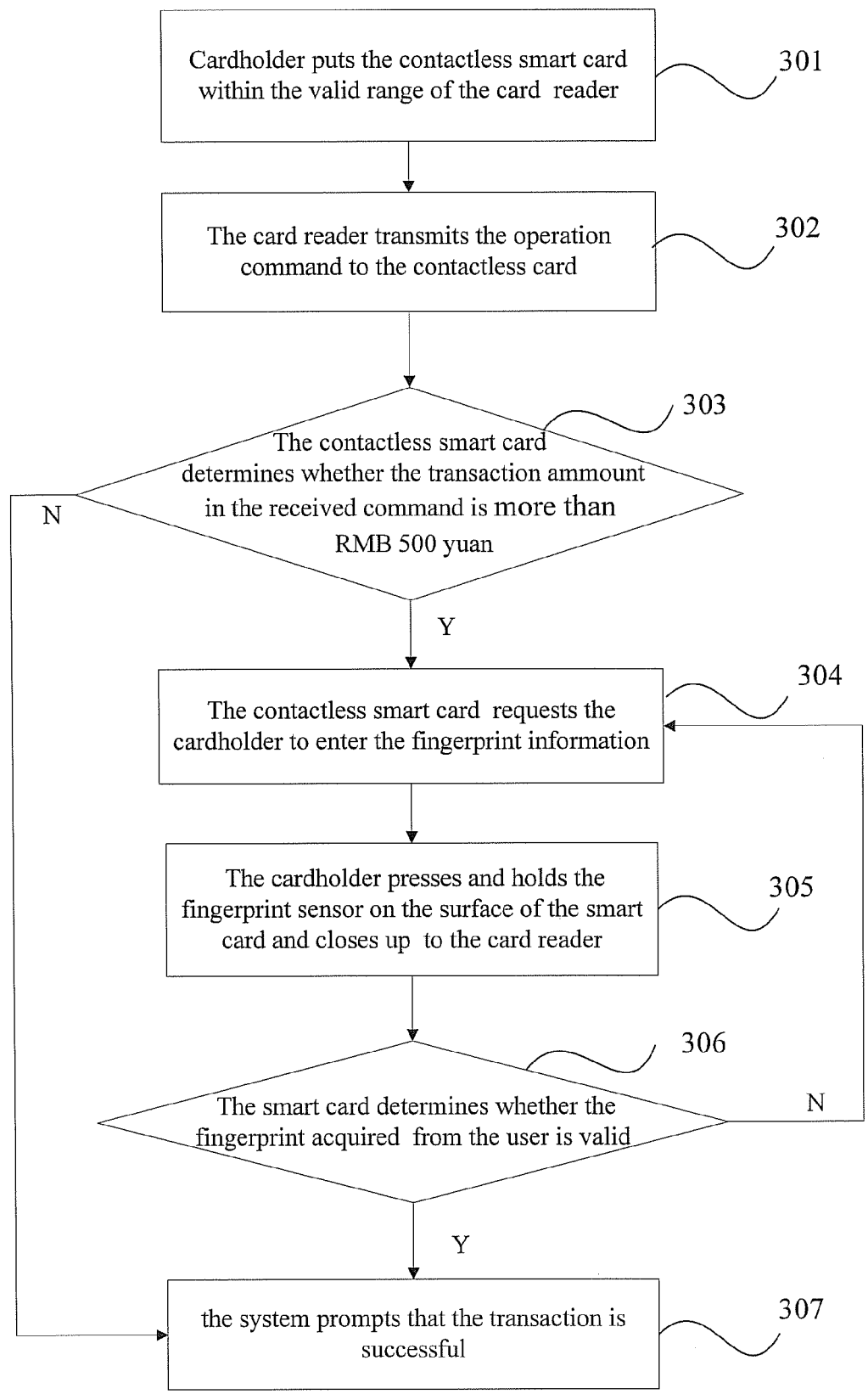
FIG. 3 shows the operation process of the fingerprint identification system of the smart card in the present invention.

Referring to FIG. 3, the process of the smart card used for payment and the units of the smart card are shown. User can customize the operation level when the card is initiated. User can customize that the smart card should not activate the fingerprint identification process if the transaction amount is less than or equal to RMB 500 yuan; Otherwise, the smart card will activate the fingerprint identification process before the transaction. Only if the user is verified as legitimate one by the fingerprint identification process, could the transaction by smart card payment be performed.

Referring to FIG. 3, the steps of the method to ensure the security and effectiveness of the transaction process or access of the smart card are as follows.

Step 301: Cardholder puts the contactless smart card within the valid range for the reader.

Step 302: The card reader transmits the operation command to the contactless smart card.

Step 303: The contactless smart card determines whether the transaction amount in the received command is more than RMB 500 yuan, if yes, go to step 304; otherwise, go to step 307.

Step 304: The contactless smart card requests the cardholder to enter the fingerprint information.

Step 305: The cardholder presses and holds the fingerprint sensor on the surface of the smart card and closes up within the valid range of the card reader.

Step 306: The contactless smart card determines whether the fingerprint acquired from the user is valid, if yes, go to step 307; otherwise, go to step 304; and Step 307: the system prompts that the transaction is successful and meanwhile displays the transaction information.

In the step 306, the process of verifying the validity of the acquired fingerprint from the user is performed inside the smart card. The details of the process are as follows: the smart card will process the fingerprint image acquired from the user by the fingerprint sensor and generate eigenvector and then transfer the preset eigenvector data of the legitimated user from its database, then determine whether the generated eigenvector matches the eigenvector of the preset fingerprint information; if they are matched, it means that the acquired fingerprint is valid, otherwise, it means that the acquired fingerprint is invalid.

The method of the present invention is applicable to secure the entrance access such as access control system of the smart building, security checkpoint at airport, computer startup protection, and file read/write operation. The operation principle is the same as the steps of the present embodiment above.

The present invention provides details of the method of activating the fingerprint identification process of a smart card according to a given condition and a device thereof, and presents security and validity in the process of transaction or access. It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

The invention claimed is:

1. A method of activating a fingerprint identification process of a contactless smart card according to a given condition, wherein the method comprises the steps of:
    1) setting a conditional value for activating the fingerprint identification process of the smart card;
    2) reading a command from a card reader by the smart card;
    3) determining by the smart card whether the command obtained in step 2) from the card reader is a command for activating the fingerprint identification process, according to the conditional value obtained in step 1) for activating the fingerprint identification process of the smart card;
    4) accordingly, activating the fingerprint identification process of the smart card for verifying a fingerprint input of a user to authenticate the user if the fingerprint identification process of the smart card is determined in the step 3), and executing the command obtained in the step 2) from a card reader if the user is a legitimate user, or rendering an error message if the user is not a legitimate user;
    or executing the command obtained in the step 2) from a card reader directly if the fingerprint identification process of the smart card is not determined in the step 3),
    the verification process for the fingerprint information input by the user is performed within the smart card.

2. The method of activating a fingerprint identification process of a contactless smart card according to a given condition as claimed in claim 1, wherein the conditional value of activating the fingerprint identification process of the smart card is an access level for secure entrance or a threshold value of a transaction amount.

3. The method of activating a fingerprint identification process of a contactless smart card according to a given condition as claimed in claim 1 or 2, wherein the fingerprint identification process is activated if the value in the command sent by the card reader is greater than the conditional value; otherwise, the fingerprint identification process is not activated.

4. The method of activating a fingerprint identification process of a contactless smart card according to a given condition as claimed in claim 1 or 2, wherein the smart card is a contactless smart card.

5. The method of activating a fingerprint identification process of a contactless smart card according to a given condition as claimed in claim 4, wherein the threshold value of the access level for secure entrance or the transaction amount is set up by a user or a distribution center of the contactless smart card.

* * * * *